United States Patent
Buehler et al.

(10) Patent No.: US 10,530,208 B2
(45) Date of Patent: Jan. 7, 2020

(54) ELECTRICAL MACHINE WITH REDUCED COGGING AND TORQUE RIPPLE

(71) Applicant: Robert Bosch GmbH, Stuttgart (DE)

(72) Inventors: Dirk Buehler, Buehl (DE); Milorad Risticevic, Buehl (DE); Steven Andrew Evans, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 15/740,988

(22) PCT Filed: Jun. 8, 2016

(86) PCT No.: PCT/EP2016/063041
§ 371 (c)(1),
(2) Date: Dec. 29, 2017

(87) PCT Pub. No.: WO2017/001159
PCT Pub. Date: Jan. 5, 2017

(65) Prior Publication Data
US 2018/0191213 A1    Jul. 5, 2018

(30) Foreign Application Priority Data

Jun. 30, 2015   (DE) .................. 10 2015 212 165

(51) Int. Cl.
*H02K 1/27* (2006.01)
*H02K 1/16* (2006.01)
*H02K 29/03* (2006.01)

(52) U.S. Cl.
CPC ............. *H02K 1/2786* (2013.01); *H02K 1/16* (2013.01); *H02K 29/03* (2013.01); *H02K 2201/03* (2013.01)

(58) Field of Classification Search
CPC ........ H02K 29/03; H02K 1/16; H02K 1/2786; H02K 21/22; H02K 2201/03; H02K 2213/03

(Continued)

(56) References Cited

U.S. PATENT DOCUMENTS 5,095,238 A * 3/1992 Suzuki .................. H02K 29/08
310/156.46
6,784,582 B1 * 8/2004 Kolomeitsev ........ H02K 1/2733
310/156.01

(Continued)

FOREIGN PATENT DOCUMENTS

CN         1653672 A      8/2005
CN       102355072 A      2/2012

(Continued)

OTHER PUBLICATIONS

US 5,030,868 A, 07/1991, Suzuki et al. (withdrawn)

(Continued)

*Primary Examiner* — Alex W Mok
(74) *Attorney, Agent, or Firm* — Michael Best & Friedrich LLP

(57) ABSTRACT

The invention describes an electrical machine comprising a stator and a rotor which is separated from the stator by an air gap and has a plurality of shell-like magnet segments which are fastened to a magnetic return path element. In this case, the magnet segments are arranged opposite one another in pairs in each case and each have a plurality of magnetically differently polarized sections in the circumferential direction, said sections each forming a magnetic pole of the rotor. In this case, recesses which each serve as outer detached pole portions are provided on that side which faces the stator in the edge zones of the magnet segments which are arranged in the circumferential direction. Furthermore, further recesses are provided on that side which faces the stator in the transition zones between the magnetically differently polarized sections of the magnet segments, said recesses serving as inner detached pole portions.

10 Claims, 8 Drawing Sheets

(58) Field of Classification Search
USPC .................................................. 310/156.38
See application file for complete search history.

(56) References Cited

U.S. PATENT DOCUMENTS

| | | | |
|---|---|---|---|
| 9,130,441 B2* | 9/2015 | Okada | H02K 1/278 |
| 2002/0074886 A1* | 6/2002 | Harada | H02K 23/04 |
| | | | 310/154.23 |
| 2006/0055266 A1 | 3/2006 | Iwami et al. | |
| 2008/0157619 A1* | 7/2008 | Wu | H02K 29/03 |
| | | | 310/156.48 |
| 2009/0015090 A1* | 1/2009 | Kimura | H02K 1/276 |
| | | | 310/156.08 |

FOREIGN PATENT DOCUMENTS

| | | |
|---|---|---|
| CN | 204145121 U | 2/2015 |
| EP | 1492213 | 12/2004 |
| JP | 2002125336 A | 4/2002 |
| JP | 2006042527 | 2/2006 |

OTHER PUBLICATIONS

International Search Report for Application No. PCT/EP2016/063041 dated Jul. 26, 2016 (English Translation, 3 pages).

* cited by examiner

ELECTRICAL MACHINE WITH REDUCED COGGING AND TORQUE RIPPLE

BACKGROUND OF THE INVENTION

The present invention relates to an electrical machine such as, for example, an electric motor or a generator, comprising a stator and a rotor having a plurality of permanent magnets.

Electrical machines of this type are employed in a variety of technical applications. Inter alia, electric motors are known, in which the rotor has a plurality of magnet segments of a permanent magnetic material, which are fastened to a magnetic return ring. Conversely, the stator has a number of field coils, each of which are wound around a pole core. In an electric machine of this type, a specific ripple can be observed in the torque generated. This torque ripple, which manifests as an angle-dependent deviation in the motor torque at a constant current, is associated with the "cogging" of the motor, and is attributable to a magnetic interaction of the stator poles with the rotor poles. However, depending upon the field of application of the electrical machine, torque ripple, which is periodically superimposed on the shaft torque of the motor, can have a negative impact upon speed regulation and the working process. In such a case, a reduction of cogging and of torque ripple in the electrical machine is desirable. To this end, the end sections of the magnet segments can be deliberately shaped. For example, by means of the appropriate flattening of the end sections of the magnet segments, "detached pole portions" can be formed, which permit a more favorable magnetic transition between the magnet segments. In an arrangement of eight poles and eight segments, 16 detached pole portions are provided accordingly. If a further reduction of torque ripple or cogging is required, further structural measures must be adopted.

SUMMARY OF THE INVENTION

The object of the invention is therefore the reduction of torque ripple and cogging in an electrical machine.

According to the invention, an electrical machine is provided, comprising a stator and a rotor which is separated from the stator by an air gap and has a plurality of shell-like magnet segments, which are fastened to a magnetic return path element. The magnet segments are arranged opposite one another in pairs in each case, and each have a plurality of differently magnetically polarized sections in the circumferential direction, each forming a magnetic pole of the rotor. In this case, recesses which each serve as outer detached pole portions are provided on that side which faces the stator in the edge zones of the magnet segments which are arranged in the circumferential direction. Moreover, further recesses are provided on that side which faces the stator in the transition zones between the differently magnetically polarized sections of the magnet segments, said recesses serving as inner detached pole portions. By the provision of the inner detached pole portions, the cogging torque, and thus the associated torque ripple, can effectively be reduced. This results in a significantly smoother running of the rotating electrical machine. By the arrangement of the recesses on the side of the magnet segments which faces the air gap, an exceptionally effective action of the inner and outer detached pole portions is achieved.

In one form of embodiment, it is provided that the recesses in the transition zones of the magnet segments the recesses each have a segmental circular cross-sectional profile. The segmental circular cross-sectional profile is conducive to an effective transition between the magnetic poles of a magnet segment.

In a further form of embodiment, it is provided that the recesses in the transition zones of the magnet segments each have a triangular, rectangular or trapezoidal cross-sectional profile. Profiles of this shape are also conducive to an effective transition between the poles of a magnet segment.

In a further form of embodiment, it is provided that the triangular, rectangular or trapezoidal cross-sectional profile of the recesses has rounded edges. By the rounding of edges, a particularly smooth transition between the different sections of the respective magnet segment can be achieved.

In a further form of embodiment, it is provided that the recesses in the transition zones of the magnet segments each have a cross-sectional profile comprised of two tangents, which are interconnected by a segment of a circle. By means of the tangential characteristic, an exceptionally uniform flux density distribution is achieved in the circumferential direction.

In a further form of embodiment, it is provided that the recesses in the transition zones of the magnet segments each have a cross-sectional profile comprised of three interconnecting segments of a circle. By means of the interconnecting segments of a circle, an exceptionally uniform flux density characteristic is achieved in the circumferential direction. Accordingly, cogging torque peaks occurring during the operation of the electrical machine can be effectively reduced.

In a further form of embodiment, it is provided that the recesses in the transition zones of the magnet segments each have a cross-sectional profile comprised of four segments of a circle, which are respectively interconnected by straight sections. The segments of a circle provide a more uniform flux density characteristic in the circumferential direction, which is perceptible in service in the form of reduced cogging torque ripple. The straight sections between the segments of a circle are exceptionally simple to produce.

By the adjustment of the length of the straight sections, the depth and width of the inner detached pole portions can be varied in a relatively simple manner.

In a further form of embodiment, it is provided that the recesses in the transition zones of the magnet segments are configured with a greater depth than the recesses in the edge zones of the magnet segments. By this arrangement, the flux density distribution in the center of an inner detached pole portion can be adjusted to the flux density distribution generated by the gap between two magnet segments.

In a further form of embodiment, it is provided that the recesses in the transition zones and the edge zones of the magnet segments have an oblique axial arrangement. By means of this measure, the torque ripple of the electrical machine can be reduced in a highly effective manner.

In a further form of embodiment, it is provided that the inner pole junctions essentially have the same magnetic properties as the respectively one magnet gap and the two outer detached pole portions of two outer pole junctions encompassing adjoining magnet segments, arranged in the region of the respective magnet gap. As the quality of the cogging torque is essentially dictated by the ratio of the outer detached pole portions to the inner detached pole portions, additional harmonics of the cogging torque can be prevented by a matching of the inner and outer pole junctions.

BRIEF DESCRIPTION OF THE DRAWINGS

The invention is described in greater detail hereinafter, with reference to figures. Herein.

DETAILED DESCRIPTION

Figure 1:
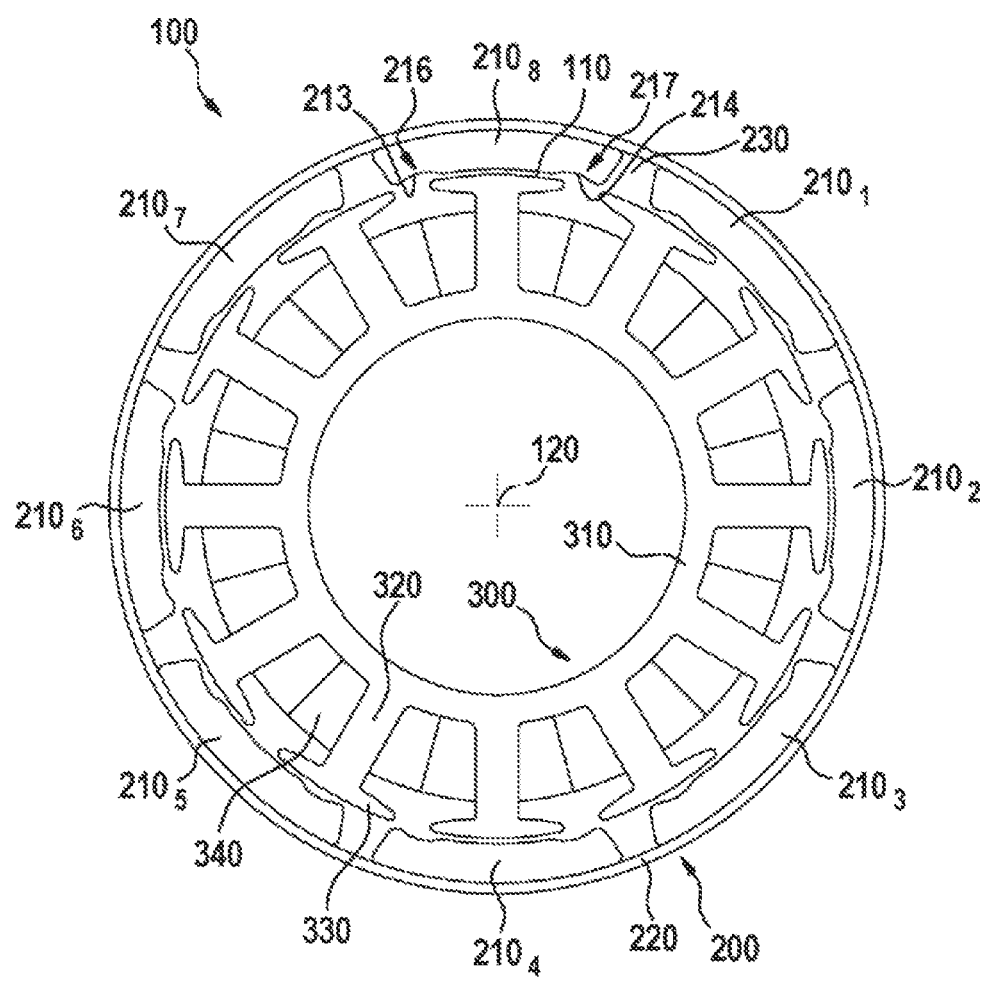
FIG. 1 shows a schematic cross-sectional representation of a conventional electrical machine having eight magnet segments and 16 outer detached pole portions.

FIG. 1 shows a longitudinal cross-section of a known electric motor. The electric motor, which is configured as an external-rotor motor, has an inner stator 300, and a rotor 200 which surrounds the stator 300 and is separated from the latter by an air gap 110. The stator 300 comprises a total of 12 pole cores 320, which are interconnected by means of an inner magnet connecting ring 310. In the interests of clarity, only one stator core is identified by a reference number. Each of the pole cores 320 are wound with an electric coil 340 which, in each case, is located in the slot configured between two adjoining pole cores 320. Each pole core 320 moreover comprises in each case a pole shoe 330, the outer surface of which has a profile which is configured as a segment of a circle.

The rotor 200, which faces the stator 300 and is arranged to rotate on an axis of rotation 120, comprises a total of eight magnet segments $210_1$ to $210_8$, which are fastened to the inner side of a cylindrical return ring 220. The outer and inner shell surfaces of the shell-like magnet segments $210_1$ to $210_8$ are preferably configured with segmental circular profiles. The magnet segments $210_1$ to $210_8$, configured as permanent magnets, each have two sections 211, 212 which are differently magnetically polarized, each of which function as a magnetic pole of the rotor. Two directly adjoining magnetic segments $210_1$ to $210_8$ are respectively mutually separated by a magnet gap 230 which, in each case, forms an outer pole junction between differently magnetized rotor poles. For the improvement of torque ripple and the reduction of cogging, the provision of outer detached pole portions on the individual magnet segments is already known. The detached pole portion thus constitutes an appropriate method for the reduction of cogging and torque ripple in electrical machines. This effect is achieved by a deliberate shaping of the components of the electric motor, wherein the edge zones of the magnet segments are configured with a specific shape. In the present case, the respective detached pole portions 213, 214 in the edge zones 216, 217 of a magnet segment $210_1$ to $210_8$ are configured in the form of recesses. The recesses 213, 214 are arranged in the side of the magnet segments $210_1$ to $210_8$ facing the stator 300. In an arrangement of eight poles and eight magnet segments, 16 detached pole portions are provided accordingly.

Figure 2:
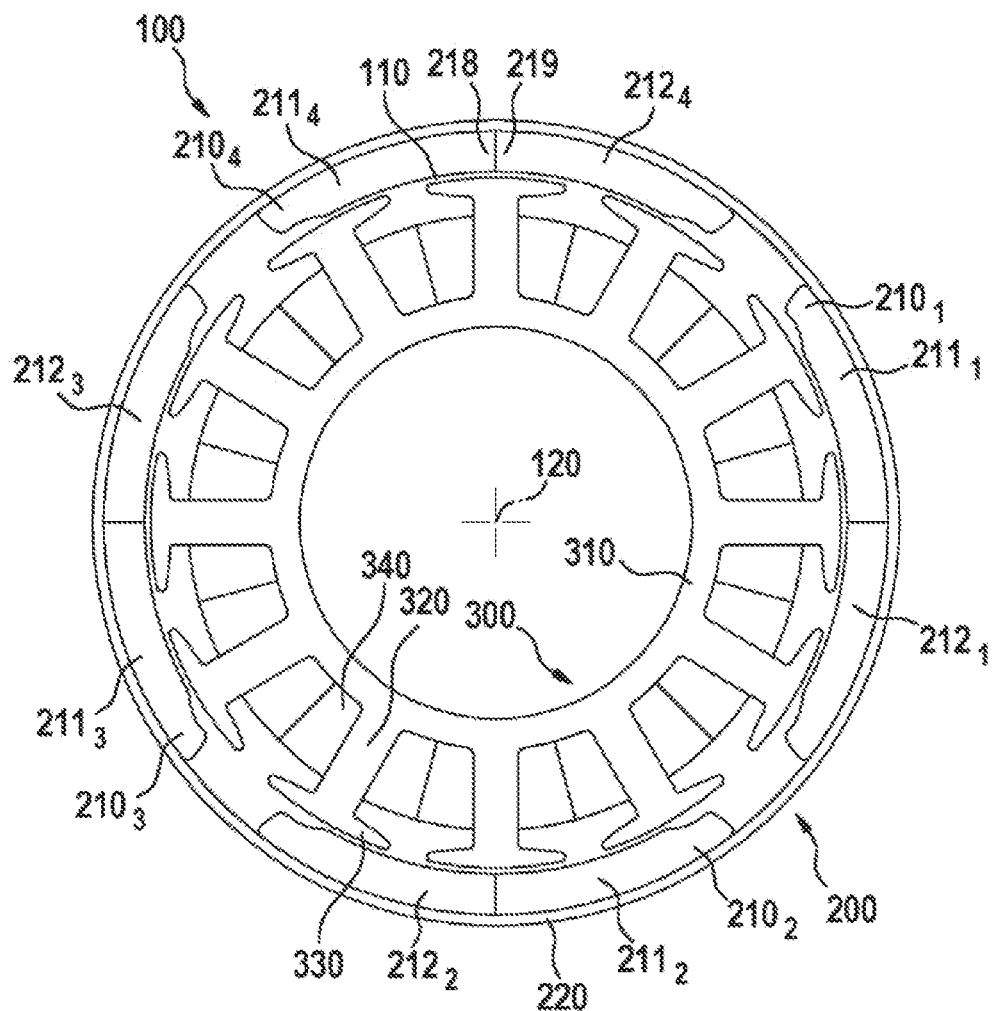
FIG. 2 shows a schematic cross-sectional representation of an external-rotor electrical machine having four magnet segments, each comprising two rotor poles.

In the interests of ease of assembly, the eight rotor poles of the exemplary electric motor represented in FIG. 1 can also be configured with fewer magnet segments. To this end, magnet segments with differently magnetically polarized sections are employed. FIG. 2 represents an exemplary electrical machine 100 having only four magnet segments $210_1$ to $210_4$, and eight rotor poles $211_1$, $212_1$ to $211_4$, $212_4$. In this arrangement, a respective inner pole junction 219 is constituted by the transition zone between the two rotor poles $211_i$, $212_i$ of a magnet segment $210_i$.

As shown in FIG. 2, in a conventional arrangement, only the pole junctions arranged in the edge zones of the magnet segments are optimized. Accordingly, only a total of eight detached pole portions are provided, wherein only one detached pole portion is assigned to each rotor pole. Consequently, in the transition zone 218 of each magnet segment 210, an abrupt magnetic transition occurs in each case, which has a negative impact upon torque ripple or the cogging torque.

Figure 3:
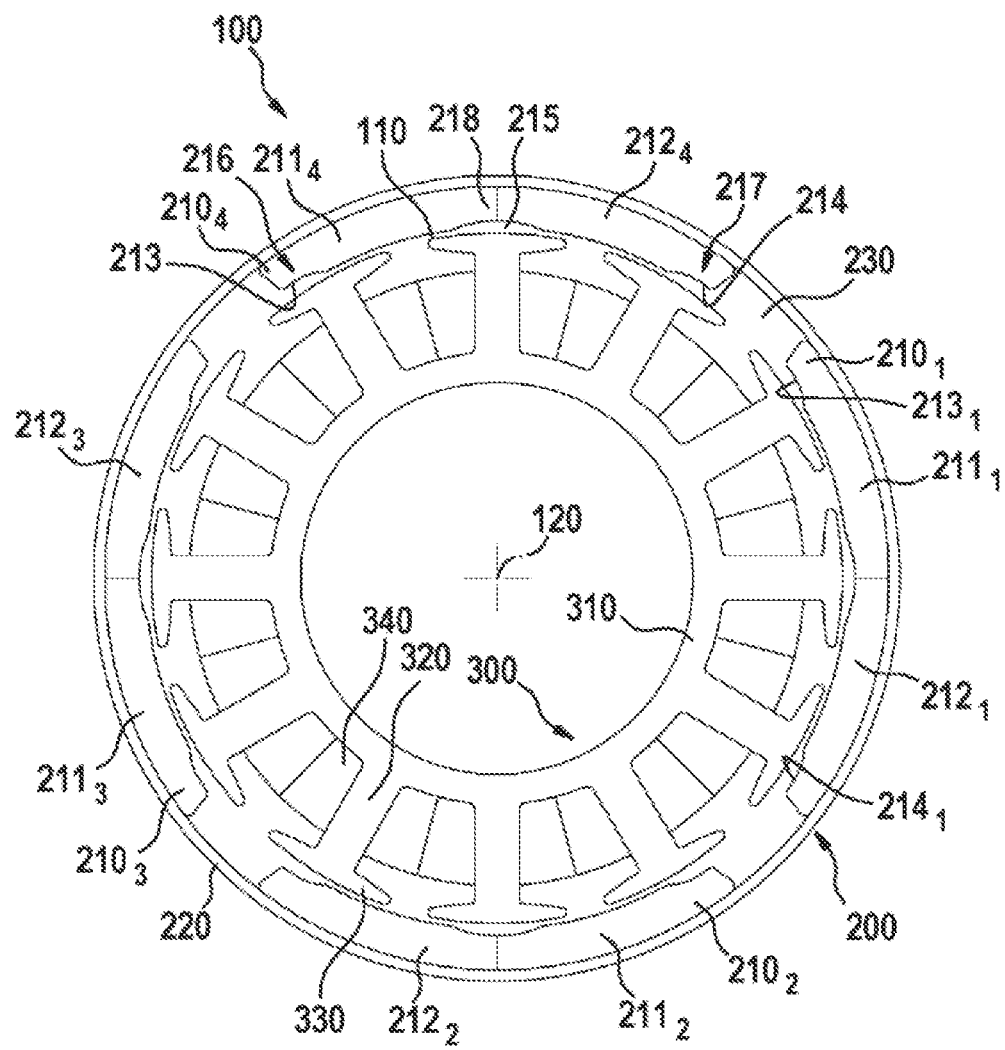
FIG. 3 shows a schematic cross-sectional representation of an external-rotor electrical machine with four magnet segments and eight rotor poles, and one inner detached pole portion in each case in the transition zone between two rotor poles of a magnet segment.

In order to reduce the torque ripple or cogging torque of the electric motor, it is proposed that additional detached pole portions should be provided in the transition zones 218 of the individual magnet segments $210_i$. This is achieved, wherein each of the rotor poles $211_i$, $212_i$ is provided with detached pole portions on either side respectively. For exemplary purposes, FIG. 3 represents a correspondingly configured electric motor 100 with four shell-like magnet segments $210_1$ to $210_4$, each having two rotor poles $211_1$, $212_1$ to $211_4$, $212_4$ and a recess 215 arranged in the corresponding transition zone 218. The recess 215 arranged on the side of the respective magnet segment facing the stator 300 functions in each case as an inner detached pole portion for the two rotor poles $211_i$, $212_i$ of the respective magnet segment $210_i$. In order to be able to achieve the maximum effect, the detached pole portion, as represented in the present exemplary embodiment, must be oriented towards the air gap, or arranged as close to the air gap as possible.

Figure 4:
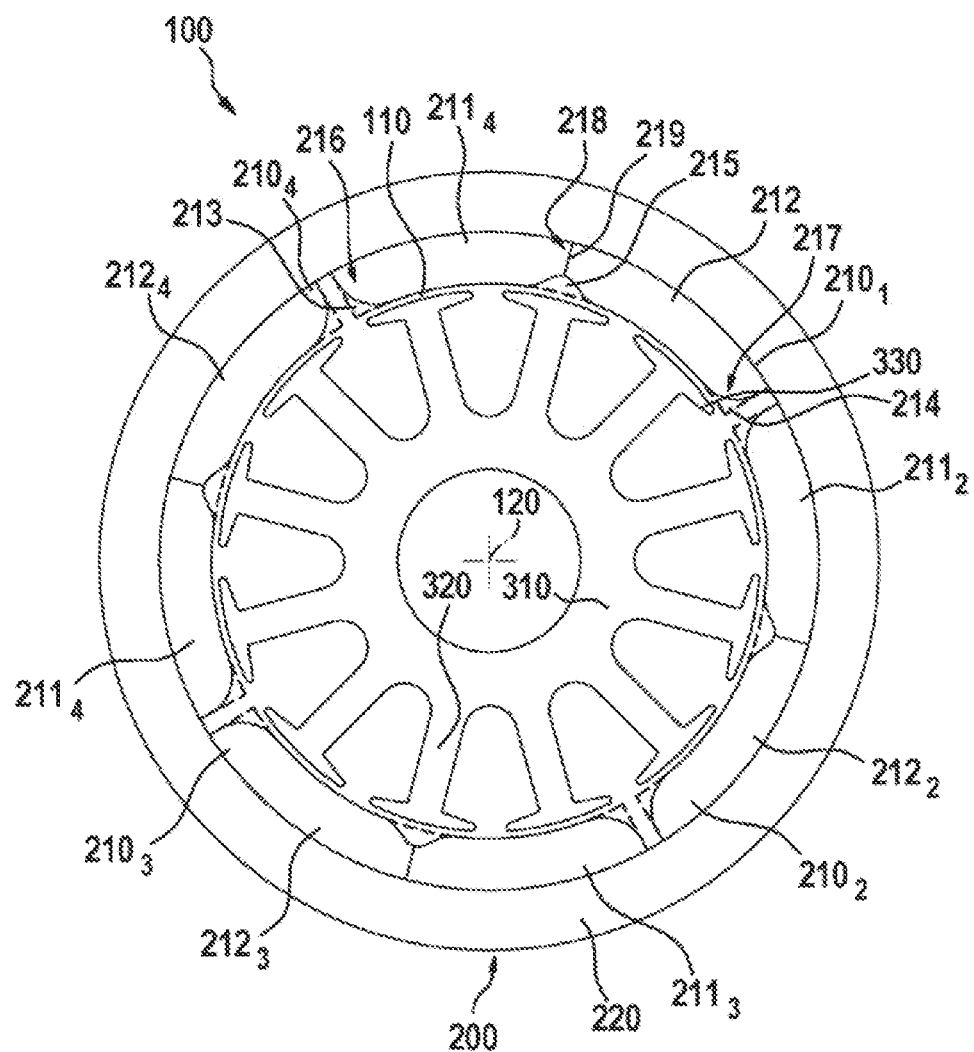
FIG. 4 shows a schematic cross-sectional representation of a further external-rotor electrical machine having four magnet segments and eight rotor poles.

FIG. 4 shows a further example of an electric motor 100 with four magnet segments $210_1$, $210_2$, $210_3$, $210_4$, each having outer and inner detached pole portions 215, 213, 214. It can be seen that the magnet gaps 230 between the magnet segments $210_1$, in comparison with the electrical machine represented in FIG. 2, have a significantly smaller width. Moreover, the inner detached pole portions 215 are configured with a greater depth, such that the attenuation of the magnetic field in the regions of the inner pole junctions and in the regions of the outer pole junctions is as uniform as possible.

Figure 5:
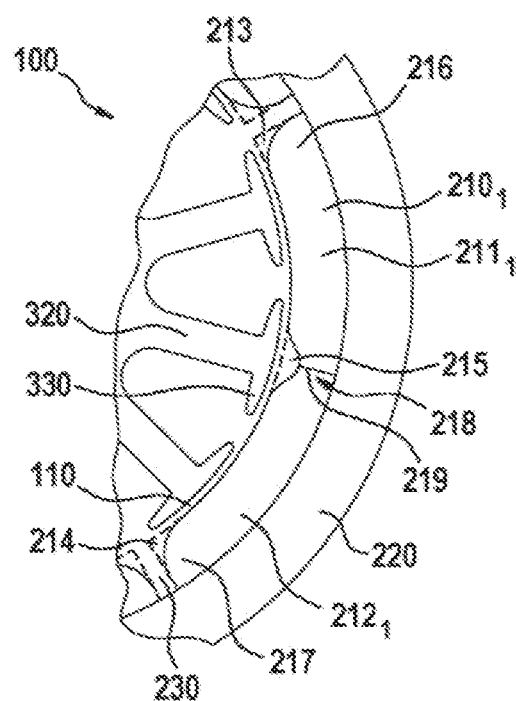
FIG. 5 shows a detailed view of the external-rotor electrical machine represented in FIG. 4.

FIG. 5 shows a detailed representation of a magnet segment $210_1$ of the electrical machine 100 shown in FIG. 4. As can be seen here, the recesses 213, 214, 215 each have rounded edges.

As represented in FIGS. 4 and 5 by dashed lines, the magnet segments $210_1$ can be constituted respectively as a segment of an annular element, which has a uniform wall thickness. To this end, the recesses functioning as detached pole portions 213, 214, 215 can be formed by the subsequent processing of the annular segments. This can be achieved, for example, by the milling of the annular segments, or by another appropriate subtractive method.

The magnetic properties of a detached pole portion are essentially dependent upon the cross-sectional profile of the recess which forms the respective detached pole portion. Accordingly, the geometry of this cross-sectional profile also has direct influence upon the contribution of the respective detached pole portion to the torque ripple or cogging torque of the electric motor. In order to reduce torque spikes, a relatively smooth magnetic transition between the magnetic poles is appropriate. In the interests of a smoother torque characteristic, it is also advantageous if a pole junction in the region of the inner detached pole portions essentially has the same magnetic properties as a pole junction in the region of the outer detached pole portions.

In principle, it is possible to adapt the profile of the inner detached pole portions 215 to their respective application. For example, detached pole portions with a relatively simple shape can be formed, the production of which involves no particular complexity, and can thus be completed relatively cost-effectively. It is moreover possible for detached pole portions to be produced with one or more radii, the production of which is more complex, but which can have a particularly favorable impact upon torque ripple.

Figure 6:
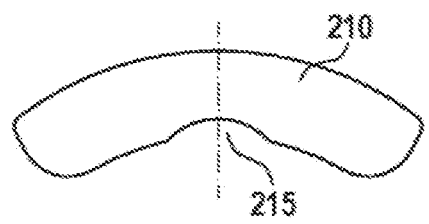
FIG. 6 shows a schematic representation of the cross-sectional profile of a magnet segment having an inner detached pole portion in the form of a segment of a circle.

Exemplary detached pole portions with different profiles are represented in FIGS. 6 to 12 hereinafter. FIG. 6 shows a schematic cross-sectional profile of a magnet segment having an inner detached pole portion 215 which is formed by a segmental circular recess. This detached pole portion 215 is exceptionally simple to produce.

Figure 7:
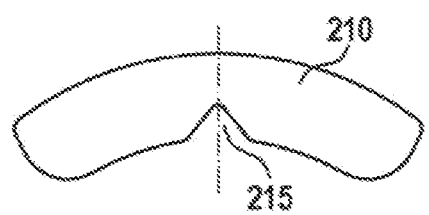
FIG. 7 shows a schematic representation of the cross-sectional profile of an alternative magnet segment having a triangular detached pole portion.
Figure 8:
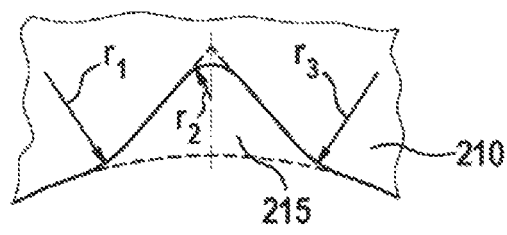
FIG. 8 shows a detailed schematic representation of an inner detached pole portion having a triangular cross-sectional profile and optionally rounded edges.

FIG. 7 shows a schematic cross-sectional profile of a further magnet segment 210, having a detached pole portion 215 which is formed by a triangular recess. The triangular profile can likewise be formed in a relatively simple manner. However, the triangular shape features three sharp edges, which result in a relatively abrupt magnetic transition. In order to improve the magnetic transition in the region of the inner detached pole portion, the edges can be rounded. To this end, an exemplary inner detached pole portion 215 is represented in FIG. 8, having a triangular profile and rounded edges. As can be seen from this detailed representation, the profile can be formed of three segments of circles of radii $r_1$, $r_2$, $r_3$, which are mutually interconnected by straight sections.

Figure 9:
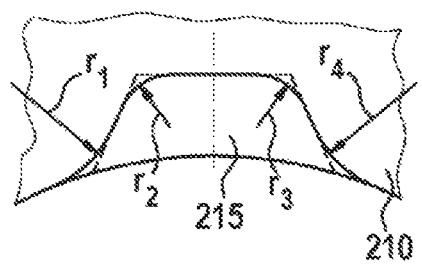
FIG. 9 shows a detailed schematic representation of an inner detached pole portion having a trapezoidal cross-sectional profile and optionally rounded edges.

FIG. 9 shows a schematic cross-sectional profile of a further inner detached pole portion 215 having a trapezoidal profile. In the interests of the uniformity of the magnetic field in the region of the detached pole portion 215, the edges of the trapezoidal recess can be rounded. A trapezoidal detached pole portion having rounded edges of this type is represented here by the solid line. In this modified detached pole portion 215, the profile can be described by four segments of circles of radii $r_1$, $r_2$, $r_3$, $r_4$, which are mutually interconnected by straight sections.

Figure 10:
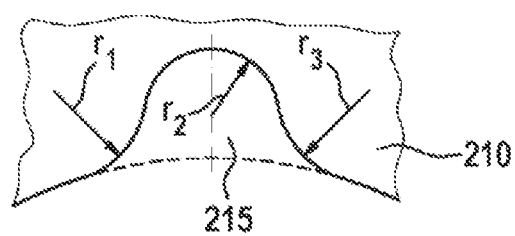
FIG. 10 shows a detailed schematic representation of an inner detached pole portion having a cross-sectional profile comprised of three interconnecting segments of a circle.

FIG. 10 shows a schematic cross-sectional profile of a further inner detached pole portion 215. In this case, the cross-sectional profile is configured in the form of three interconnecting segments of circles, wherein the segments of circles may have different or equal radii $r_1$, $r_2$, $r_3$.

Figure 11:
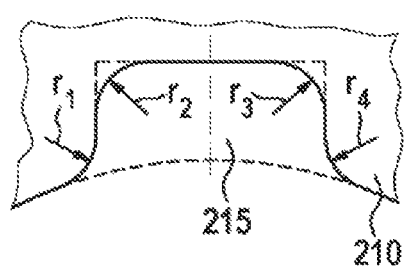
FIG. 11 shows a detailed schematic representation of an inner detached pole portion having a rectangular cross-sectional profile and optionally rounded edges.

FIG. 11 shows a schematic cross-sectional profile of a further inner detached pole portion 215. In this case the cross-sectional profile is configured in the form of a rectangle and, as represented in FIG. 11 by a solid line, can have rounded edges. A cross-sectional profile of this type can essentially be described by four segments of circles, which are respectively mutually interconnected by straight sections.

In principle, the geometry of the cross-sectional profiles represented here can be configured at will, by a variation of the radii of the respective segments of circles, and of the length of the straight sections by means of which the individual segments of circles are mutually interconnected. Specifically, by increasing the depth and the width of the corresponding detached pole portion, the magnetic field in this region can be reduced.

Figure 12:
FIG. 12 shows a detailed schematic representation of an inner detached pole portion having a cross-sectional profile in the form of two tangents which are interconnected by a segment of a circle.

In place of the exemplary geometric forms represented here, including e.g. a segment of a circle, a triangle, a rectangle or a trapezium, a particularly favorable magnetic field characteristic in the region of the central detached pole portion can be achieved by the employment of tangents. To this end, FIG. 12 represents the exemplary cross-sectional profile of a central detached pole portion 215 formed by two tangents, wherein the two tangents are interconnected by a segment of a circle of radius $R_1$. The tangential characteristic of the detached pole portion 215 in this region results in an exceptionally smooth variation in the magnetic field strength, which has a favorable impact upon torque ripple.

Figure 13:
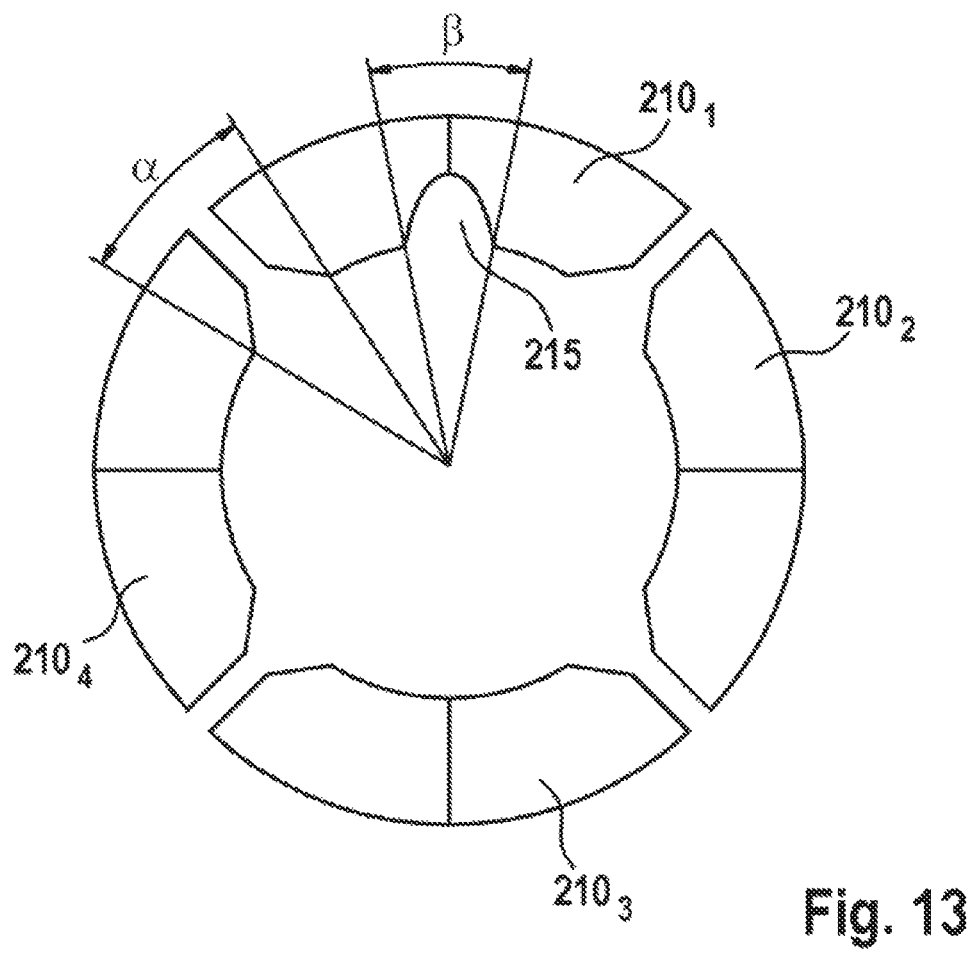
FIG. 13 shows a schematic cross-sectional representation of four magnet segments, for the clarification of the relationship between the outer and inner detached pole portions.

FIG. 13 shows the relationship of an outer pole junction α, configured between two adjoining magnet segments, with an inner pole junction β arranged in the center of the magnet segment. It is particularly favorable if an inner pole junction β, considered from the position of a stator pole, essentially has the same magnetic properties as a pole junction α between two adjoining magnet segments.

Figure 14:
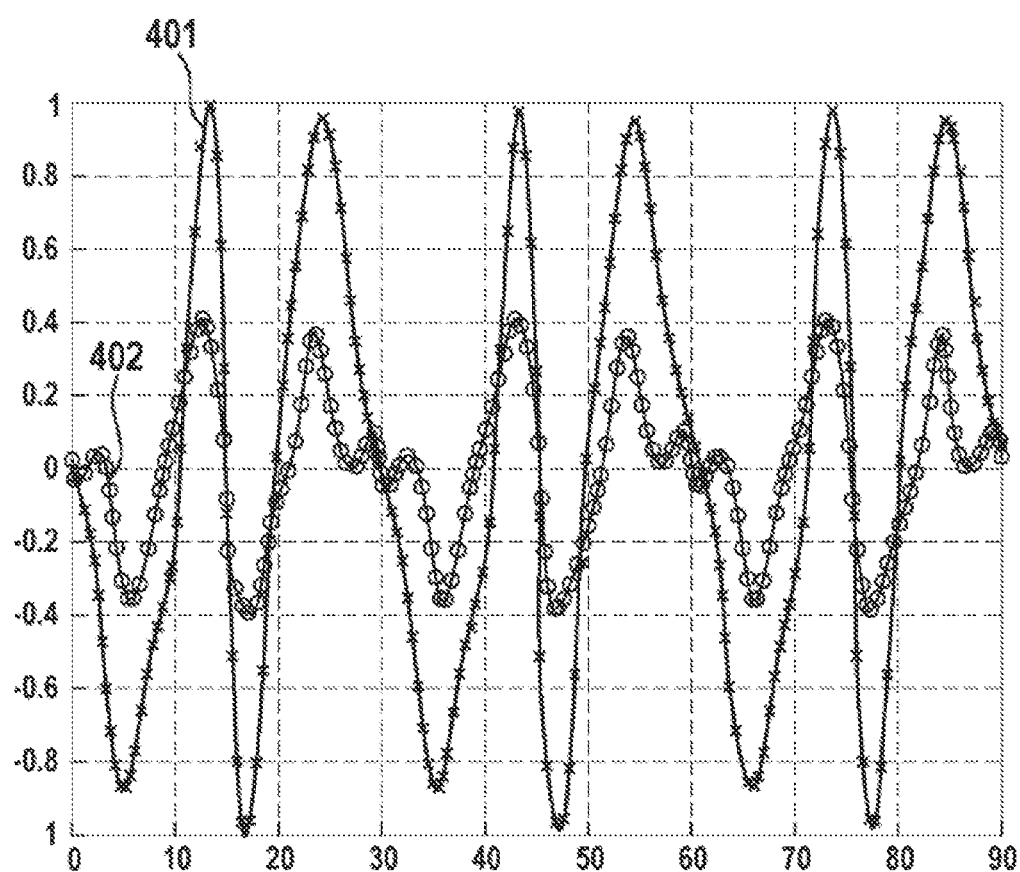
FIG. 14 shows an exemplary diagram for the clarification of the angular dependency of the torque in magnet segments with and without an inner detached pole portion.

By the incorporation of an inner detached pole portion, torque ripple, and the associated cogging torque, can be significantly reduced. FIG. 14 shows an exemplary diagram of the torque ripple characteristic of an electric motor, with and without inner detached pole portions. Herein, the torque acting on the rotor is plotted against the angle of rotation of the rotor. The first curve 401 represents the torque characteristic of a conventional electric motor, the magnet segments of which have only outer detached pole portions. Conversely, curve 402 represents the torque characteristic of an electric motor, in which the magnet segments are additionally provided with inner detached pole portions. It will be seen here that, by the incorporation of the inner detached pole portions, the amplitudes of torque variations are significantly reduced. In consequence, torque ripple, and the associated cogging torque, are effectively reduced.

In the figures shown here, inner detached pole portions have been represented throughout in conjunction with magnet segments having only two magnetic poles. In principle, however, it is also possible for the concept described herein to be applied to inner detached pole portions of magnet segments having more than two magnetic poles.

Although the invention has been described above with reference to specific exemplary embodiments, it is not at all limited to the latter. A person skilled in the art thus will be able to vary and mutually combine the characteristics described in an appropriate manner, without departing from the core concept of the invention.

The invention claimed is:

1. An electrical machine (100) comprising a stator (300) and a rotor (200) which is separated from the stator (300) by an air gap (110) and which has a plurality of shell-like magnet segments ($210_1$, $210_2$, $210_3$, $210_4$) fastened to a magnetic return path element (220), wherein the magnet segments ($210_1$, $210_2$, $210_3$, $210_4$) are arranged opposite one another in pairs in each case, and each have a plurality of differently magnetically polarized sections ($211_1$, $212_1$, $211_2$, $212_2$, $211_3$, $212_3$, $211_4$, $212_4$) in a circumferential direction, each forming a magnetic pole of the rotor (200), wherein recesses (213, 214) which each serve as outer detached pole portions are provided on a side which faces the stator (300) in edge zones (216, 217) of the magnet segments ($210_1$, $210_2$, $210_3$, $210_4$) which are arranged in the circumferential direction, and wherein further recesses (215) are additionally provided on the side which faces the stator (300) in transition zones (218) between differently magnetically polarized sections ($211_1$, $212_1$, $211_2$, $212_2$, $211_3$, $212_3$, $211_4$, $212_4$) of the magnet segments ($210_1$, $210_2$, $210_3$, $210_4$), said recesses serving as inner detached pole portions, wherein at least one of the recesses (215) in the transition zones (218) of the magnet segments $210_1$, $210_2$, $210_3$, $210_4$) has a cross-sectional profile comprised of three interconnecting segments of a circle, wherein a first segment and a second segment of the three interconnecting segments are convex relative to the magnet segments, and a third segment of the three interconnecting segments is concave relative to the magnet segments, the first and second segments positioned on opposite sides of the third segment.

2. The electrical machine (100) as claimed in claim 1, wherein the recesses (215) in the transition zones (218) of the magnet segments ($210_1$, $210_2$, $210_3$, $210_4$) each have a segmental circular cross-sectional profile.

3. The electrical machine (100) as claimed in claim 1, wherein the recesses (215) in the transition zones (218) of the magnet segments ($210_1$, $210_2$, $210_3$, $210_4$) each have a triangular, rectangular or trapezoidal cross-sectional profile.

4. The electrical machine (100) as claimed in claim 3, wherein the triangular, rectangular or trapezoidal cross-sectional profile of the recesses (215) arranged in the transition zones (218) has rounded edges.

5. The electrical machine (100) as claimed in claim 1, wherein at least one of the recesses (215) in the transition zones (218) of the magnet segments ($210_1$, $210_2$, $210_3$, $210_4$) each has a cross-sectional profile comprised of two tangents, which are interconnected by a segment of a circle.

6. The electrical machine (100) as claimed in claim 1, wherein at least one of the recesses (215) in the transition zones (218) of the magnet segments ($210_1$, $210_2$, $210_3$, $210_4$) each has a cross-sectional profile comprised of three interconnecting segments of a circle.

7. The electrical machine (100) as claimed in claim 1, wherein at least one of the recesses (215) in the transition zones (218) of the magnet segments ($210_1$, $210_2$, $210_3$, $210_4$) each has a cross-sectional profile comprised of four segments of a circle, which are respectively interconnected by straight sections.

8. The electrical machine (100) as claimed in claim 1, wherein the recesses (215) in the transition zones (218) of the magnet segments ($210_1$, $210_2$, $210_3$, $210_4$) are configured with a greater depth than the recesses (213, 214) in the edge zones (216, 217) of the magnet segments ($210_1$, $210_2$, $210_3$, $210_4$).

9. The electrical machine (100) as claimed in claim 1, wherein the recesses (215) in the transition zones (218) and the edge zones (216, 217) of the magnet segments ($210_1$, $210_2$, $210_3$, $210_4$) have an oblique axial arrangement.

10. The electrical machine (100) as claimed in claim 1, wherein inner pole junctions (219) essentially have the same magnetic properties as the respectively one magnet gap (230) and the two outer detached pole portions (213, 214) of two outer pole junctions encompassing adjoining magnet segments ($210_1$, $210_2$, $210_3$, $210_4$), arranged in a region of the respective magnet gap (230).

* * * * *